(12) United States Patent
Huang (10) Patent No.: US 10,462,434 B2
(45) Date of Patent: Oct. 29, 2019

(54) PROJECTION DEVICE AND PROJECTION METHOD (71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/052,596

(22) Filed: Aug. 1, 2018

(65) Prior Publication Data

US 2019/0273898 A1 Sep. 5, 2019

(30) Foreign Application Priority Data

Mar. 2, 2018 (CN) .......................... 2018 1 0175898

(51) Int. Cl.
*H04N 9/31* (2006.01)
(52) U.S. Cl.
CPC ........... *H04N 9/3111* (2013.01); *H04N 9/312* (2013.01)
(58) Field of Classification Search
CPC combination set(s) only.
See application file for complete search history.

(56) References Cited

U.S. PATENT DOCUMENTS

| | | | |
|---|---|---|---|
| 2007/0097334 A1 | 5/2007 | Damera-Venkata et al. | |
| 2008/0211995 A1* | 9/2008 | Jeon | H04N 3/08 349/95 |
| 2009/0303444 A1* | 12/2009 | Huang | G03B 21/28 353/33 |
| 2013/0130182 A1* | 5/2013 | Markle | G03B 27/522 430/322 |
| 2015/0042564 A1* | 2/2015 | Shiina | G02B 27/1006 345/158 |
| 2015/0310789 A1 | 10/2015 | Heide et al. | |

OTHER PUBLICATIONS

Gerwin Damberg, Helge Seetzen and Greg Ward, "3.2: High Dynamic Range Projection Systems", SID 2007 Digest, p. 5-7.
Felix Heide,Douglas Lanman,Dikpal Reddy,Jan Kautz,Kari Pulli and David Luebke, "Cascaded Displays: Spatiotemporal Super-resolution using Offset Pixel Layers" ACM Transactions on Graphics (Proceedings of SIGGRAPH 2014).

* cited by examiner

*Primary Examiner* — Sultan Chowdhury
(74) *Attorney, Agent, or Firm* — CKC & Partners Co., LLC (57) ABSTRACT A projection device includes a first chip set and a second chip set. The first chip set includes multiple first micro mirror. Angles of the first micro mirror are adjusted in multiple first time intervals, so as to output a first image set according to a light source. The first image set includes multiple first images corresponding to the first time intervals. Angles of the second micro mirror are adjusted correspondingly in the first time intervals, so as to output a second image set according to the first image set. The second image set includes multiple second images corresponding to the first time intervals.

20 Claims, 5 Drawing Sheets

PROJECTION DEVICE AND PROJECTION METHOD

RELATED APPLICATIONS

This application claims priority to China Application Serial Number 201810175898.4, filed Mar. 2, 2018, which is herein incorporated by reference in its entirety.

BACKGROUND

Technical Field

The present disclosure relates to a projection device and a projection method, and more particularly, to a technique for reflecting light sequentially by two chip sets in a first time interval to output images.

Description of Related Art

Currently, projection technology has been able to achieve the image resolution of 7680×4320 pixels (commonly known as "8K") so as to provide consumers with more detailed image performance. However, since the "8K" high-resolution projection technology must match the corresponding hardware equipment, resulting in high production costs and market prices, and thus it is difficult to become the mainstream of the market.

In order to respond to market demand, an important area of research in the field involves ways in which to use lower-level hardware equipment to improve its projection technology and improve display performance of output image.

SUMMARY

One aspect of the present disclosure is a projection device. The projection device comprises a first chip set and a second chip set. The first chip set comprises multiple first micro mirrors, wherein angles of the first micro mirrors are adjusted correspondingly in multiple first time intervals to output a first image set according to a light source. The first image set comprises multiple first images corresponding to the first time intervals. The second chip set comprises multiple second micro mirrors, wherein angles of the plurality of second micro mirrors are adjusted correspondingly in the first time intervals to output a second image set according to the first image set. The second image set comprises multiple second images corresponding to the first time intervals.

Another aspect of the present disclosure is a projection method. The projection method comprises the following steps. Projecting a light to a first chip set by a light source. Adjusting angles of multiple first micro mirrors in multiple first time intervals by the first chip set so as to output a first image set according to the light source. The first image set comprises multiple first images corresponding to the first time intervals. Adjusting angles of multiple second micro mirrors in the first time intervals to output a second image set according to the first image set. The second image set comprises multiple second images corresponding to the first time intervals.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
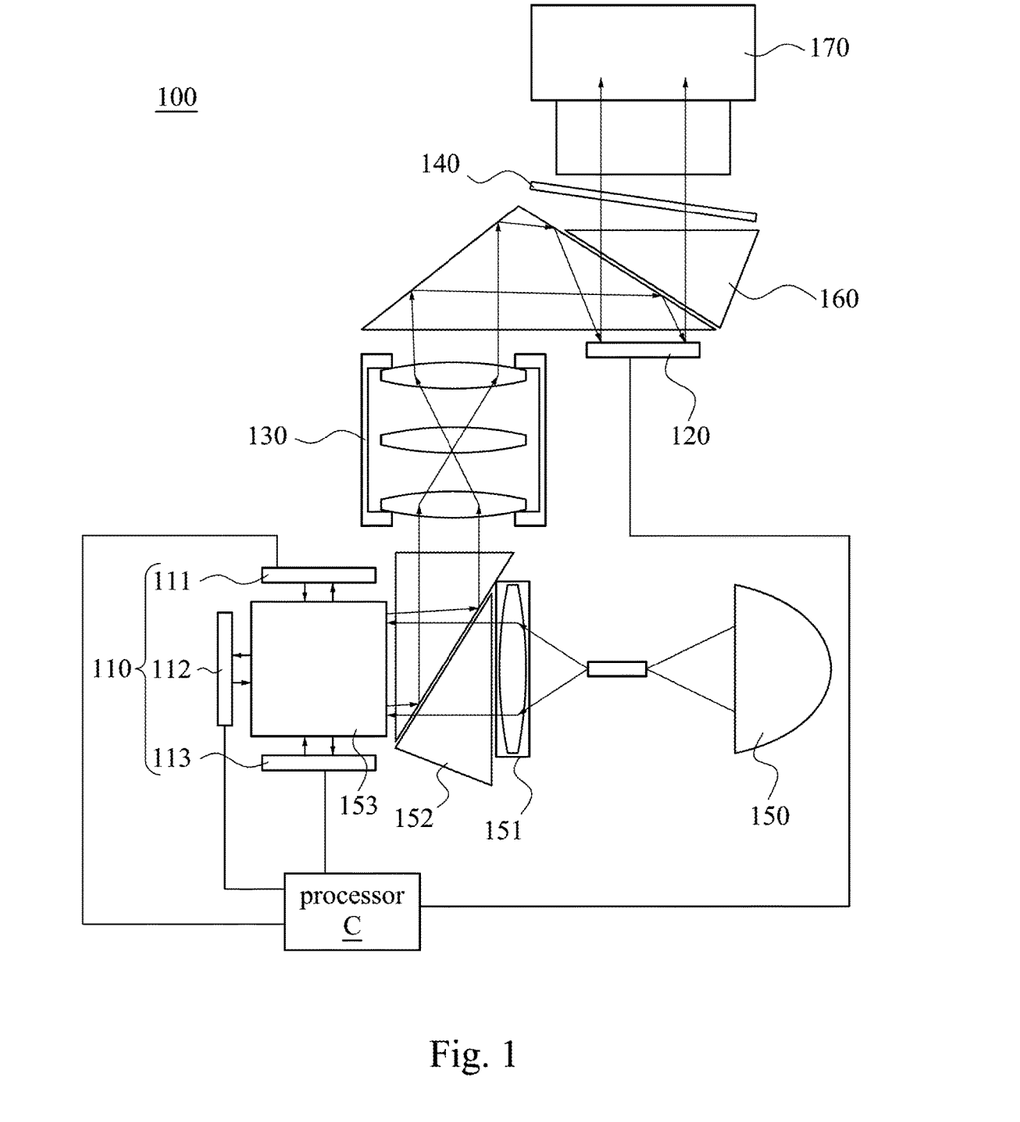
FIG. 1 is a schematic diagram of a projection device in some embodiments of the present disclosure.

Refer to FIG. 1, FIG. 1 is a schematic diagram of a projection device in some embodiments of the present disclosure. The projection device 100 is configured to reflect the light, which is projected by a light source 150, according to an image signal to output an image signal. In some embodiments, the light source 150 is arranged in the projection device 100, and after the light is reflected, the light may be projected to the outside by an output lens 170.

In some embodiment, the projection device 100 includes at least a first chip set 110 and a second chip set 120. The first chip set 110 includes multiple first micro mirrors. The angles of the first micro mirror are correspondingly adjusted in multiple first time intervals, so that when the light source 150 projects light onto the first chip set 110, the first micro mirrors can reflect light to output the first image set. The first image set includes multiple first images corresponding to the first time intervals. The second chip set 120 includes multiple second micro mirrors. The angles of the second micro mirrors are correspondingly adjusted in the first time interval, so that after the first image set is projected to the second chip set 120, the second micro mirrors can reflect the first image set to output the second image set. The second image set includes multiple second images corresponding to the first time interval.

In some embodiments, the projection device 100 uses Dual-Modulation technology to increase the image resolution of the image. For example, the image resolution of multiple first images, which are generated by the first chip set 110, are 2716×1528 pixels. The second chip set 120 is used as a "switch". That is, in the first time intervals, the second chip set 120 only selectively reflects the different quarter regions in the first image at a time. Therefore, after the second chip set 120 reflects the first image four times sequentially and generates four second images, since the adjustment rate of the micro mirrors is extremely fast, the second image set, which is formed by the four second images, can be viewed as an image composed of four sets of different pixel images same superimposed. The second image set has an image resolution of 5432×3056 pixels for the user's eyes.

Figure 2:
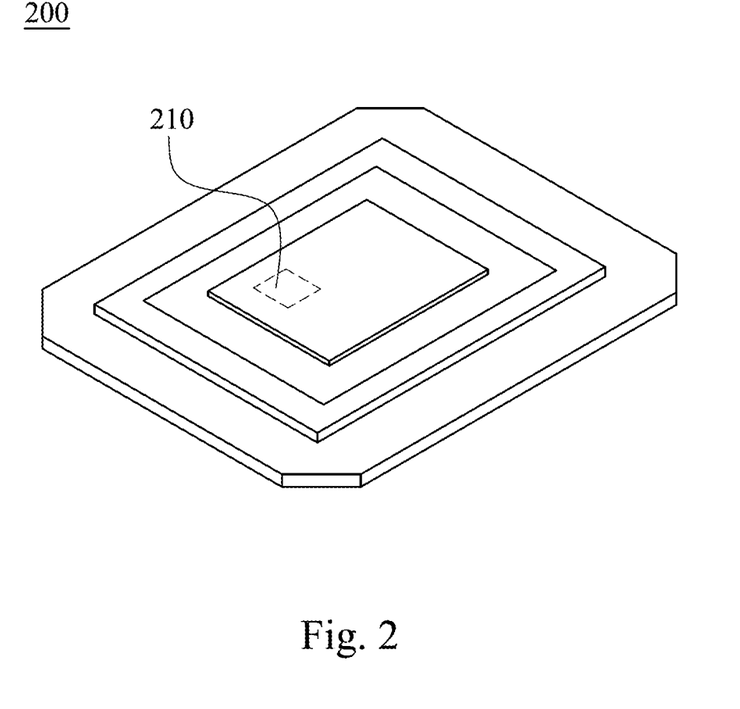
FIG. 2 is a schematic diagram of a digital micro-mirror device chip in some embodiments of the present disclosure.

For ease of understanding, FIG. 2 illustrates the operating principle of the first chip set 110 and the second chip set 120. Please refer to FIGS. 1 and 2. FIG. 2 is a schematic diagram of "digital micro-mirror device chip 200" according to some embodiments of the present disclosure. In some embodiments, the first chip set 110 and the second chip set 120 are provided with a digital micro-mirror device chip 200 (DMD chip). The DMD chip 200 is a device having a plurality of tiny, rotatable micro mirrors 210. The DMD chip 200 can control the rotation angle of each micro mirror 210 according to an image signal, a control signal or a driving signal, so as to generate a desired image frame by reflecting light. Each of the micro mirrors 210 is used to display one pixel of an image.

In some embodiments, the projection device 100 further includes a processor C. The processor C is electrically connected to the first chip set 110 and the second chip set 120, and is configured to output a first set control signal and a second set of control signal, so that the first chip set 110 can adjust angles of each first micro mirror according to the first set control signal, and the second chip set 120 adjusts the angle of each second micro mirror according to the second set control signal. In some other embodiments, the processor C may also outputs an image signal to the first chip set 110 and the second chip set 120. The first chip set 110 and the second chip set 120 analyze the image signal and generate the first set control signal and the second set control signal, and then adjust the angles of the first micro mirrors and the second micro mirrors.

Figure 3:
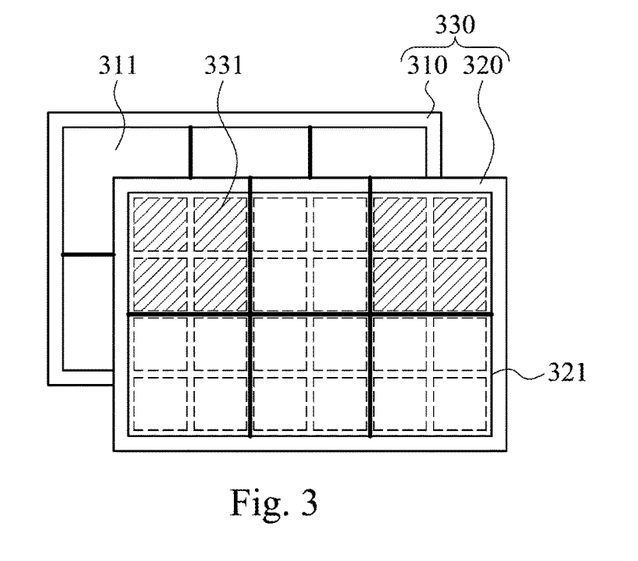
FIG. 3 is a schematic diagram of the first images and the second images in some embodiments of the present disclosure.
Figure 4:
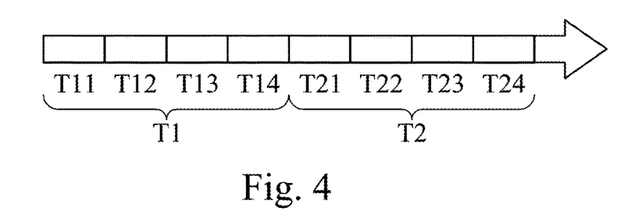
FIG. 4 is a schematic diagram of first time intervals and the second time intervals in some embodiments of the present disclosure.

Refer to FIG. 3 and FIG. 4, FIG. 3 is a schematic diagram of the first images and the second images in some embodiments of the present disclosure. FIG. 4 is a schematic diagram of first time intervals and the second time intervals in some embodiments of the present disclosure. In order to facilitate the description of technical principles, and to maintain the clarity of the drawings. In FIG. 3, only the parts of the first image 310 and the second image 330 are shown. As described above, the DMD chip reflects light through the micro mirrors to form an image. The first chip set 110 and the second chip set 120 are used to generate a first image 310 and a switch image 320, respectively. In some embodiments, the first chip set 110 is used to generate pixels of the image (e.g., red, green, blue light). The second chip set 120 is used for "switching" function. That is, in the first time intervals T11-T14, the second micro mirrors are configured to selectively reflect the different regions of the first images 310 respectively, so that after the first images 310 are filtered by the switch image 320, multiple second images 330 are respectively generated.

As shown in FIG. 3, in the first time interval T11, the first chip set 110 outputs a first image 310 according to the light of the light source 150. The first image 310 includes a plurality of first pixels 311. The corresponding position of each micro mirrors on the second chip set 120 maintains an offset distance from the corresponding position of each micro mirror of the first chip set 110. Each switching pixel 321 of the switch image 320 corresponds to different partial regions (e.g., quarter) of each first pixel 311, respectively. Therefore, at each first time interval T11-T14, the second chip set 120 will only selectively reflect the partial regions of the first image 310 (such as the shaded region of FIG. 3) so as to generate the second images 330.

For example, the second chip set 120 sets the adjacent four second micro mirrors as the same group. In the first time interval T11, the second chip set 120 only controls one of the second micro mirrors in each group to reflect the first images 310. Therefore, as shown in FIG. 3, in the first time interval T11, in each of the four adjacent first pixels 311 in the first images 310, a quarter of the images are reflected and the rest are masked. Similarly, in the first time interval T12 to T14, the second chip set 120 reflects the other quarter of the first images 310 sequentially. Therefore, through the positional relationship between the first chip set 110 and the micro mirror of second chip set 120, and through the "switch" function by the second chip set 120, the present disclosure can simulate the second pixel 331 with a more detailed display effect, and enhance the image resolution of the output second images 330.

In some embodiments, the projection device 100 further includes an illumination light path 151, a first total reflection prism (TIR Prism) 152, a relay lens set 130, and a second total reflection prism (TIR Prism) 160. The illumination light path 151 includes a lens for receiving the light, which is projected by the light source 150, and uniformly outputting the light toward the first chip set 110. The first total reflection prism (TIR Prism) 152 is used to reflect the first image set, which is outputted by the first chip set 110, to the relay lens set 130. The relay lens set 130 further reflects the first image set to the second chip set 120 as a conjugate image. Finally, the second image, which is outputted by the second chip set 120, is output to the outside through the second total reflection prism (TIR Prism) 160.

Please refer FIG. 1-FIG. 5, in some embodiments, in addition to the Dual-Modulation technology, the projection device 100 can increase the image resolution of the first image set through pixel-shifting technology. As shown in FIG. 1, the projection device 100 also includes an optical actuator 140. After the projection device 100 completes the first Dual-Modulation in the first time intervals T11-T14, the projection device 100 can perform the second pixel-shifting in the second time intervals T21-T24 through the same principle. Then, through the optical actuator 140, the images, which outputted by the two pixel-shifting, maintains an offset position, and accordingly, the image resolution can be improved.

For example, in some embodiments, angles of the first micro mirrors of the first chip set 110 can be adjusted correspondingly in the second time intervals T21-T24 to output a third image set according to the light source 150. The third image set includes multiple third images corresponding to the second time intervals T21 to T24. Angles of the second micro mirrors of the second chip set 120 can be adjusted correspondingly in the second time intervals T21-

T24 to output a fourth image set according to the third image set. The fourth image set includes multiple fourth images, corresponding to the second time intervals T21-T24. The relative relationship between the third image and the fourth image and imaging principle is the same as the relationship between the first image 310 and the second images 330 in FIG. 3, so it will not be described here.

For ease of description, the first time intervals T11 to T14 are defined as "first modulated period T1" and the second time intervals T21 to T24 are defined as "second modulated period T2." After the first modulate period T1 ends, the optical actuator 140 starts (e.g., deflects an angle) to change the projection angle of the fourth image set, which is outputted by the second chip set 120 in the second modulation period T2, so that there has an offset position between the fourth image set of second the modulation period T2 and the second image set of the first modulation period T1. For example, refer to FIG. 5, the offset distance between the second image set 410 and the fourth image set 420 is half the length of the diagonal of the quarter pixel. In this way, in the case where the length of time of the first modulation period T1 and the second modulation period T2 is extremely short, user will see the projection image 400, which is superimposed by the second image set 410 and the fourth image set 420.

As above, when the image resolution of the first images 310 is 2716×1528 pixels, the projection device 100 forms the second image set 410 in the first modulation period T1 through the dual modulation technology, so that the image resolution of the second image set 410 is increased to 5432×3056. In the second modulation period T2, the projection device 100 further uses a pixel-shifting technique to generate an offset distance between the second image set 410 and the fourth image set 420. Since the second image set 410 and the fourth image set 420 are sequentially projected to the user's eyes in a short time, the second image set 410 and the fourth image set 420 can be superimposed to form the projection image 400, and the image resolution of the projection image 400 can be enhanced to more than 7680× 4320 pixels in visual effects.

In some embodiments, the optical actuator 140 may be a reflective lens, which is configured to reflect the fourth image set 420 and change the projection angle of the fourth image set 420. In some other embodiments, the optical actuator 140 may be a refractive lens, which is configured to refract the fourth image set 420 and change the projection angle of the fourth image set 420. The optical actuator 140 may adjust its angle or orientation through a drive mechanism to change the projection angle of the fourth image set 420. Since one skilled in the art can understand the operating principle of the drive mechanism and the optical actuator 140, so it is not described here.

In the present disclosure, the first chip set 110 may include a single DMD chip, or three DMD chips. FIG. 1 shows the first chip set1 schematic with three DMD chips. In some embodiments, the first chip set 110 includes a plurality of first DMD chips 111-113. The projection device 100 further includes a dispersing prism 153. The dispersing device 154 is configured to disperse light, which is projected by the light source 150, into a plurality of primary lights sequentially, and the plurality of primary lights are emitted in different directions so as to projected to the first digital micro-mirror device chip sequentially. The first DMD chips 111-113 are provided with the first micro mirrors to change the angles of the first micro mirrors according to the control signal and reflect the primary light, respectively (e.g., each of the first DMD chips 111-113 only processes a single primary light) to produce multiple primary images, and multiple primary images are projected along the same direction so as to form the first image set.

Figure 6:
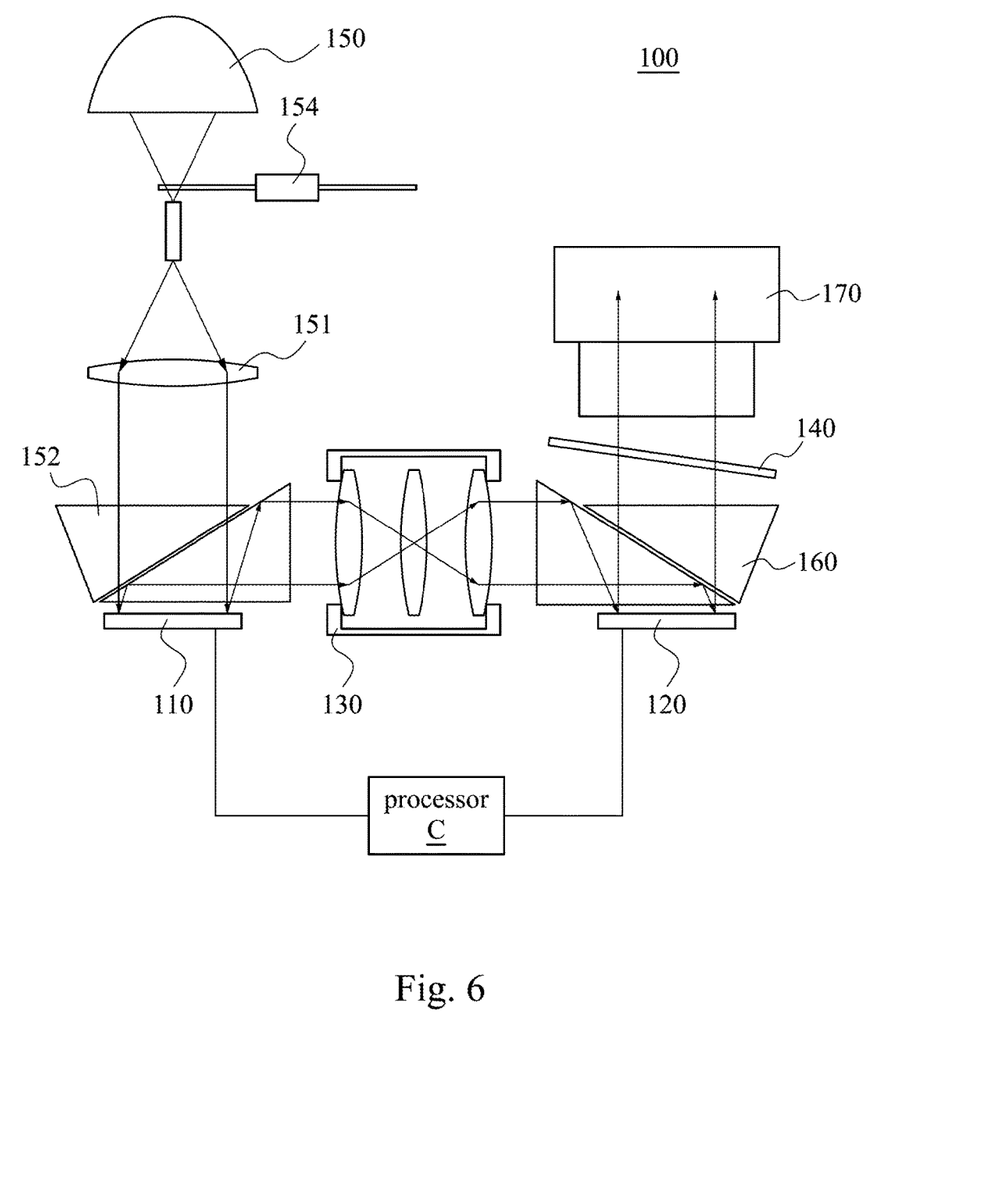
FIG. 6 is a schematic diagram of a projection device in some embodiments of the present disclosure.

FIG. 6 shows a schematic of the first chip set 110, using a single chip DMD chip. In FIG. 6, the structures and characteristics of the relay lens set 130 and the second chip set 120 are the same as those of the foregoing embodiment, and are not described herein. In some embodiments, the first chip set 110 includes a first DMD chip. The first DMD chip is provided with a plurality of first micro mirrors. The projection device further includes a dispersing device 154 for dispersing light, which is projected by the light source 150, into multiple primary light sequentially (e.g., red, green, blue) and projecting the primary light onto the first DMD chip to output the first image set, sequentially. In some embodiments, the dispersing device 154 is a color wheel that can sequentially filter different primary colors to sequentially output a single primary light.

Figure 7:
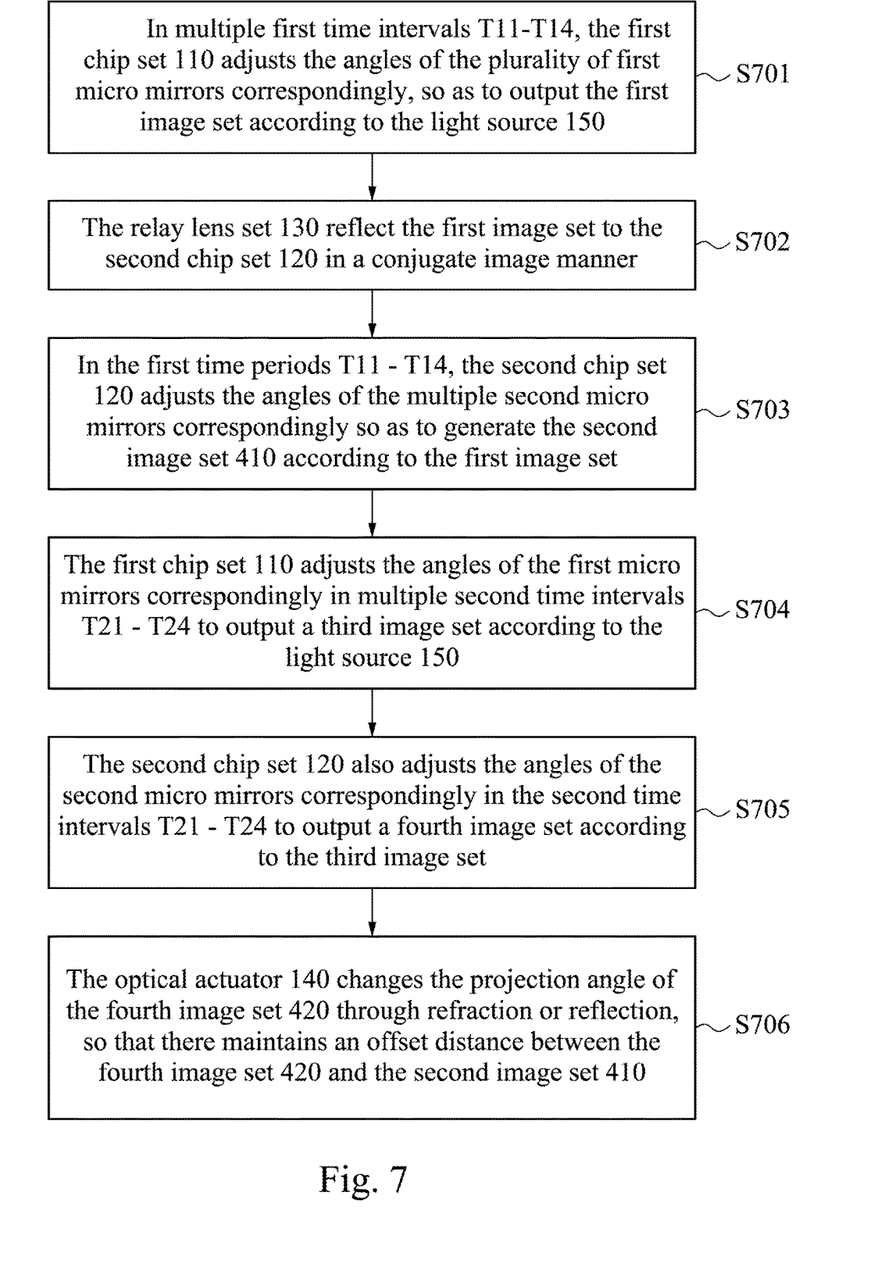
FIG. 7 is a flowchart illustrating a projection method in some embodiments of the present disclosure.

FIG. 7 is a flowchart illustrating a projection method in some embodiments of the present disclosure. The projection device 100 generates a high resolution projection image 400 according to the following projection method. In step S701, the light source 150 projects light onto the first chip set 110, and in multiple first time intervals T11-T14, the first chip set 110 adjusts the angles of the plurality of first micro mirrors correspondingly, so as to output the first image set according to the light source 150. The first image set includes multiple first images 310 corresponding to the first time intervals T11-T14.

The first chip set 110 may include a single DMD chip, or three DMD chips. In some embodiments, if the first chip set 110 includes a single DMD chip, the light emitted by the light source 150 can be dispersed through the dispersing device 154 into multiple primary lights. In contrast, if the first chip set 110 includes three DMD chips, the light emitted by the light source 150 can be dispersed through the dispersing prism 153 into multiple primary lights, which are projected in different directions.

In step S702, the first image set is reflected by a first total reflection prism (TIR Prism) 152 and is projected to a relay lens set 130. The relay lens set 130 can reflect the first image set to the second chip set 120 in a conjugate image manner.

In step S703, in the first time periods T11-T14, the second chip set 120 adjusts the angles of the multiple second micro mirrors correspondingly. Therefore, when the first image set is projected onto the second chip set 120, the second micro mirrors on the second chip set 120 selectively and respectively reflect different regions of the first images (e.g., reflect quarter of the first image each time, as shown as FIG. 3) in the first time intervals T11-T14 to generate the second image set sequentially and form the second image set 410.

In step S704, the first chip set 110 adjusts the angles of the first micro mirrors correspondingly in multiple second time intervals T21-T24 to output a third image set according to the light source 150. The third image set includes multiple third images corresponding to the second time intervals T21-T24.

In step S705, the second chip set 120 also adjusts the angles of the second micro mirrors correspondingly in the second time intervals T21-T24 to output a fourth image set according to the third image set. The fourth image set includes multiple fourth images corresponding to the second time intervals T21-T24.

Figure 5:
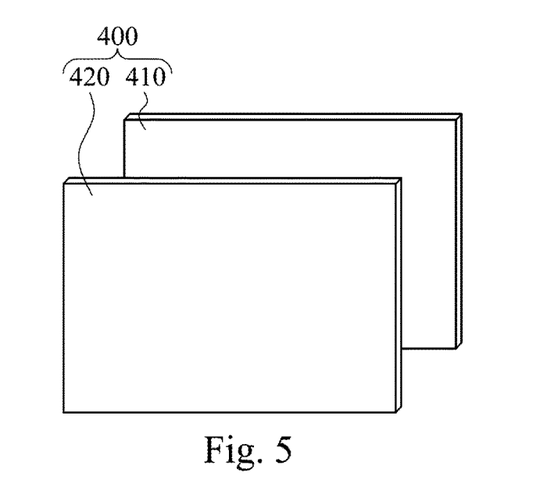
FIG. 5 is a schematic diagram of the second image set and fourth image set in some embodiments of the present disclosure.

In step S706, the optical actuator 140 changes the projection angle of the fourth image set 420 through refraction or reflection, so that an offset distance is maintained between the fourth image set 420 and the second image set 410. As shown in FIG. 5, there is a positional offset distance between the second image set 410 and the fourth image set 420. The length of the offset distance is "half the diagonal of a quarter pixel". Therefore, for the user, the high resolution projection image 400 can be formed by sequentially projecting the second image set 410 and the fourth image set 420.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A projection device, comprising:
   a first chip set comprising a plurality of first micro mirrors, wherein angles of the plurality of first micro mirrors are adjusted correspondingly in a plurality of first time intervals to output a first image set according to a light source, and the first image set comprises a plurality of first images corresponding to the plurality of first time intervals; and
   a second chip comprising a plurality of second micro mirrors, wherein angles of the plurality of second micro mirrors are adjusted correspondingly in the plurality of first time intervals to output a second image set according to the first image set, and the second image set comprises a plurality of second images corresponding to the plurality of first time intervals.

2. The projection device of claim 1, wherein the plurality of second micro mirrors are configured to selectively reflect different regions of the plurality of first images in the plurality of first time intervals respectively to generate the second image set.

3. The projection device of claim 2, wherein the plurality of second micro mirrors are configured to sequentially reflect different quarter region of the plurality of first images to generate the plurality of second images.

4. The projection device of claim 1, further comprising:
   a processor configured to output a first set control signal and a second set control signal respectively to the first chip set and the second chip, so that the first chip set adjusts the angles of the plurality of first micro mirrors according to the first set control signal, and the second chip adjusts the angles of the plurality of second micro mirrors according to the second set control signal.

5. The projection device of claim 1, further comprising:
   a relay lens set configured to reflect the first image set to the second chip.

6. The projection device of claim 1, wherein the angles of the plurality of first micro mirrors are adjusted correspondingly in a plurality of second time intervals to output a third image set according to the light source, and the third image set comprises a plurality of third images corresponding to the plurality of second time intervals;
   wherein the angles of the plurality of second micro mirrors are adjusted correspondingly in the plurality of second time intervals to output a fourth image set according to the third image set, and the fourth image set comprises a plurality of fourth images corresponding to the plurality of second time intervals;
   wherein the projection device further comprises:
   an optical actuator configured to change a projection angle of the fourth image set, so that an offset distance is maintained between the fourth image set and the second image set.

7. The projection device of claim 6, wherein the optical actuator is configured to reflect the fourth image set so as to change the projection angle of the fourth image set.

8. The projection device of claim 6, wherein the optical actuator is configured to refract the fourth image set so as to change the projection angle of the fourth image set.

9. The projection device of claim 1, wherein the first chip set comprises:
   a first digital micro-mirror device chip provided with the plurality of first micro mirrors; and
   wherein the projection device further comprises:
   a dispersing device configured to disperse light, which is projected by the light source, into a plurality of primary lights sequentially, and project the plurality of primary lights to the first digital micro-mirror device chip sequentially.

10. The projection device of claim 1, further comprising:
    a dispersing prism configured to disperse light, which is projected by the light source, into a plurality of primary lights sequentially, wherein the plurality of primary lights are projected in different directions; and
    wherein the first chip set comprises:
    a plurality of first digital micro-mirror device chips provided with the plurality of first micro mirrors, wherein the plurality of first micro mirrors is configured to reflect the plurality of primary lights respectively so as to generate a plurality of primary images, and the plurality of primary images are projected along the same direction so as to form the first image set.

11. A projection method, comprising:
    projecting a light to a first chip set by a light source;
    adjusting angles of a plurality of first micro mirrors in a plurality of first time intervals by the first chip set so as to output a first image set according to the light source, wherein the first image set comprises a plurality of first images corresponding to the plurality of first time intervals; and
    adjusting angles of a plurality of second micro mirrors by a second chip in the plurality of first time intervals to output a second image set according to the first image set, wherein the second image set comprises a plurality of second images corresponding to the plurality of first time intervals.

12. The projection method of claim 11, wherein the plurality of second micro mirrors are configured to selectively reflect different regions of the plurality of first images in the plurality of first time intervals respectively to generate the second image set.

13. The projection method of claim 12, wherein the plurality of second micro mirrors sequentially reflect different quarter region of the plurality of first images to generate the plurality of second images.

14. The projection method of claim 11, further comprising:
    reflecting the first image set to the second chip by a relay lens set.

15. The projection method of claim 11, further comprising:
    outputting a first set control signal and a second set control signal to the first chip set and the second chip respectively by a processor, so that the first chip set adjusts the angles of the plurality of first micro mirrors according to the first set control signal, and the second chip adjusts the angles of the plurality of second micro mirrors according to the second set control signal.

16. The projection method of claim 11, further comprising:

adjusting the angles of the plurality of first micro mirrors correspondingly in a plurality of second time intervals to output a third image set according to the light source, wherein the third image set comprises a plurality of third images corresponding to the plurality of second time intervals;

adjusting the angles of the plurality of second micro mirrors correspondingly in the plurality of second time intervals to output a fourth image set according to the third image set, wherein the fourth image set comprises a plurality of fourth images corresponding to the plurality of second time intervals; and changing a projection angle of the fourth image set by an optical actuator, so that an offset distance is maintained between the fourth image set and the second image set.

17. The projection method of claim 16, wherein the optical actuator is configured to reflect the fourth image set so as to change the projection angle of the fourth image set.

18. The projection method of claim 16, wherein the optical actuator is configured to refract the fourth image set so as to change the projection angle of the fourth image set.

19. The projection method of claim 11, further comprising:

dispersing the light into a plurality of primary lights sequentially by a dispersing device, so that the plurality of primary lights are projected to the first chip set sequentially.

20. The projection method of claim 11, further comprising:

dispersing the light into a plurality of primary lights sequentially by a dispersing prism, so that the plurality of primary lights are projected in different directions; and reflecting the plurality of primary lights respectively by a plurality of first digital micro-mirror device chip of the first chip set so as to generate a plurality of primary images, wherein the plurality of primary images are projected along the same direction so as to form the first image set.

* * * * *